(12) United States Patent
Suter et al.

(10) Patent No.: US 11,980,116 B1
(45) Date of Patent: May 14, 2024

(54) SYSTEM AND A METHOD FOR AUTOMATION OF AGRICULTURAL TREATMENTS

(71) Applicant: EARTHSENSE INC., Champaign, IL (US)

(72) Inventors: Josie Lynn Suter, Urbana, IL (US); Michael James Hansen, Champaign, IL (US); Girish Vinayak Chowdhary, Champaign, IL (US); Chinmay Prakash Soman, Urbana, IL (US)

(73) Assignee: EARTHSENSE INC., Champaign, IL (US)

( * ) Notice: Subject to any disclaimer, the term of this patent is extended or adjusted under 35 U.S.C. 154(b) by 0 days.

(21) Appl. No.: 18/096,287

(22) Filed: Jan. 12, 2023

(51) Int. Cl.
| | | |
|---|---|---|
| *A01B 79/02* | (2006.01) |
| *A01B 69/00* | (2006.01) |
| *A01B 69/04* | (2006.01) |
| *A01B 79/00* | (2006.01) |
| *A01C 21/00* | (2006.01) |
| *A01N 25/02* | (2006.01) |
| *G05D 1/00* | (2006.01) |
| *G06V 10/82* | (2022.01) |
| *G06V 20/56* | (2022.01) |

(52) U.S. Cl.
CPC .......... *A01B 79/005* (2013.01); *A01B 69/008* (2013.01); *A01B 79/02* (2013.01); *A01C 21/002* (2013.01); *A01N 25/02* (2013.01); *G05D 1/0223* (2013.01); *G05D 1/0246* (2013.01); *G06V 10/82* (2022.01); *G06V 20/56* (2022.01); *G05D 2201/0201* (2013.01)

(58) Field of Classification Search
CPC ..... A01B 79/005; A01B 69/008; A01B 79/02; A01C 21/002; A01N 25/02; G05D 1/0223; G05D 1/0246; G05D 2201/0201; G06V 10/82; G06V 20/56
See application file for complete search history.

(56) References Cited

U.S. PATENT DOCUMENTS

| | | | |
|---|---|---|---|
| 10,721,857 B2 | 7/2020 | Tippery et al. | |
| 2010/0249998 A1* | 9/2010 | Holland | A01B 79/005 700/240 |
| 2022/0092705 A1* | 3/2022 | Khait | G06N 3/08 |

(Continued)

FOREIGN PATENT DOCUMENTS

CN 108849440 A 11/2018

*Primary Examiner* — Nga X Nguyen
(74) *Attorney, Agent, or Firm* — Shumaker, Loop & Kendrick, LLP

(57) ABSTRACT

A system and a method for automation of agricultural treatments. The system receives a set of instructions for the agricultural treatment. The set of instructions may include a type of agricultural treatment, and a target location. Further, the system may determine chemical parameters including a composition, a dosage, and a quantity of a chemical required for the agricultural treatment. Further, the system may be configured to navigate the robot to the target location. Further, the system may detect a spraying section based on the type of agricultural treatment. Subsequently, the system may determine a speed of the robot, a proximity of the robot to the spraying section, and a rate of chemical flow. Further, the system may be configured to control the robot. Finally, the system may be configured to dispense the chemical using a spraying equipment.

18 Claims, 8 Drawing Sheets

(56) References Cited

U.S. PATENT DOCUMENTS

| | | | |
|---|---|---|---|
| 2022/0121847 A1* | 4/2022 | Sibley | G06T 7/579 |
| 2022/0147053 A1* | 5/2022 | Lin | G06N 20/00 |
| 2022/0297148 A1* | 9/2022 | Wilcox | B05B 12/12 |
| 2023/0306795 A1* | 9/2023 | Lechner | A01M 7/0089 |

* cited by examiner

SYSTEM AND A METHOD FOR AUTOMATION OF AGRICULTURAL TREATMENTS

PRIORITY INFORMATION

The present application does not claim priority from any other application.

TECHNICAL FIELD

The present subject matter described herein, in general, relates to automating agricultural treatments, and, more particularly, to spraying chemicals to perform agricultural treatments by controlling a robot or a machine.

BACKGROUND

Robotics and digital agriculture technology have a lot of potential to boost agriculture's productivity, accessibility, and sustainability. Agriculture's essential labor deficit has been addressed through the development of agricultural robots. The agricultural robots are used to carry out various agricultural tasks like planting and harvesting, plant scouting, treatment of pests and diseases, and more in order to reduce the amount of labor that is needed. Although research towards automating agricultural tasks using the agricultural robots has been ongoing, conventional methods are not entirely prepared for real-world situations. For instance, it can be difficult to achieve totally automated fertilizer spraying for an agricultural field since different sorts or stages of crops may be growing in different portions of the field, each of which requires various types and degrees of fertilizer.

SUMMARY

Before the present system(s) and method(s), are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for automation of agricultural treatments. This summary is not intended to identify essential features of the claimed subject matter, nor is it intended for use in determining or limiting the scope of the claimed subject matter.

In one implementation, a method for automation of agricultural treatments is disclosed. The robot may be at least a field robot, an agricultural robot, an aerial robot, a drone, and the like. The method may comprise receiving a set of instructions, for an agricultural treatment. The set of instructions may comprise a type of agricultural treatment, and a target location. The agricultural treatment may be at least one of fertilizer spraying, pesticide spraying, herbicide spraying, and insecticide spraying. Further, the method may comprise determining chemical parameters based on the set of instructions using machine learning algorithms. The chemical parameters may include a composition, a dosage, and a quantity of a chemical required for the agricultural treatment. Further, the robot may be navigated to the target location using at least one of autonomous navigation and human assisted navigation.

Further, a spraying section may be detected based on the type of agricultural treatment using a set of cameras, and a plurality of sensors installed on the robot. The spraying section may be detected by analysing a set of images obtained from the set of cameras using a machine learning algorithm. It may be noted that the spraying section may be a part of the target location. Subsequently, the method may comprise determining a speed of the robot, a proximity of the robot to the spraying section, and a rate of chemical flow based on the type of agricultural treatment, the dosage, and the spraying section using a robot control model. Further, the robot may be controlled to match the determined speed of the robot and the proximity of the robot. The method may employ navigation algorithms to control the robot. Finally, the chemical may be dispensed using a spraying equipment based on the determined rate of chemical flow, and the dosage using a closed loop flow control mechanism and a spraying equipment handling model. In one aspect, the aforementioned method for automation of agricultural treatments may be performed by a processor using programmed instructions stored in a memory.

In another implementation, a non-transitory computer-readable medium embodying a program executable in a computing device for automation of agricultural treatments is disclosed. The robot may be at least a field robot, an agricultural robot, an aerial robot, a drone, and the like. The program may comprise a program code for receiving a set of instructions, for an agricultural treatment. The set of instructions may comprise a type of agricultural treatment, and a target location. The agricultural treatment may be at least one of fertilizer spraying, pesticide spraying, herbicide spraying, and insecticide spraying. Further, the program may comprise a program code for determining chemical parameters based on the set of instructions using machine learning algorithms. The chemical parameters may include a composition, a dosage, and a quantity of a chemical required for the agricultural treatment. Further, the program may comprise a program code to navigate the robot to the target location. The robot may be navigated using at least one of autonomous navigation, assisted navigation, and manual navigation by a user.

Further, the program may comprise a program code for detecting a spraying section based on the type of agricultural treatment. The spraying section may be detected using a set of cameras, and a plurality of sensors installed on the robot. The spraying section may be detected by analysing a set of images obtained from the set of cameras using a machine learning algorithm. It may be noted that the spraying section may be a part of the target location. Subsequently, the program may comprise a program code for determining a speed of the robot, a proximity of the robot to the spraying section, and a rate of chemical flow based on the type of agricultural treatment, the dosage, and the spraying section using a robot control model.

Further, the program may comprise a program code for controlling the robot to match the determined speed of the robot and the proximity of the robot. The method may employ navigation algorithms to control the robot. Finally, the program may comprise a program code for dispensing the chemical using a spraying equipment. The chemical may be dispensed based on the determined rate of chemical flow, and the dosage using a closed loop flow control mechanism and a spraying equipment handling model.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for automation of agricultural treatments disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
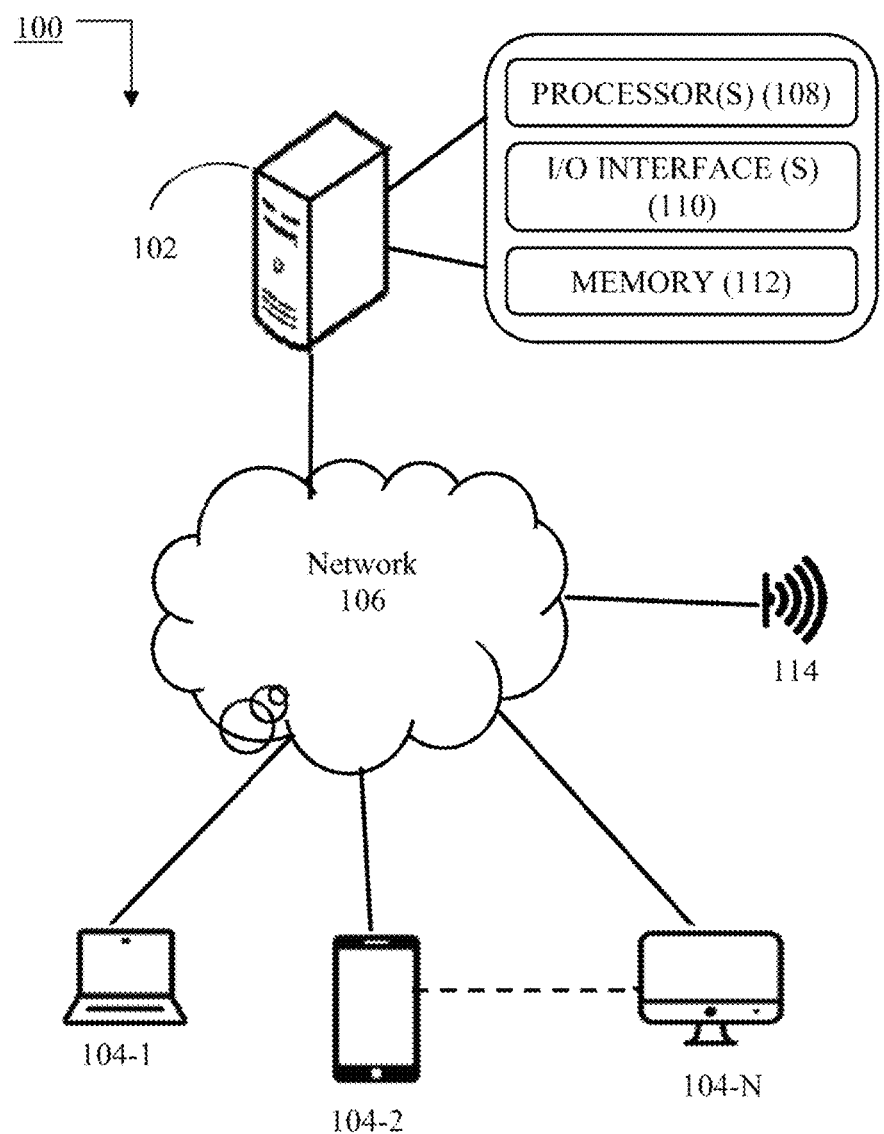
FIG. 1 illustrates a network implementation for automation of agricultural treatments, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "determining," "obtaining," "detecting," "navigating," "controlling," "dispensing," and other forms thereof, are intended to be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for automation of agricultural treatments. In an embodiment, the system may be implemented on a robot. The robot may be a machine, an unmanned aerial vehicle, and a field robot. The robot may have a plurality of sensors and one or more mechanical equipment mounted on it. In another embodiment, the system may be implemented on a remote server using cloud storage. The system may receive data from the robot and may transmit data back to the robot upon processing the received data for a task. The task may be to control the robot for an agricultural treatment. In an embodiment, the task may be to control a fleet of robots simultaneously. The system may receive a set of instructions for the agricultural treatment. The set of instructions may include a type of agricultural treatment, and a target location. Further, the system may be configured to determine chemical parameters comprising a composition, a dosage, and a quantity of a chemical required for the agricultural treatment based on the set of instructions using machine learning algorithms. It may be noted that the chemical may be at least a liquid chemical, and a solid chemical. Subsequently, the system may be configured to navigate the robot to the target location. The system may then detect a spraying section based on the type of agricultural treatment. The system may be configured to obtain a set of images using a set of cameras, and a plurality of sensors installed on the robot, after reaching the target location, to detect the spraying section. Subsequently, the system may determine a speed of the robot, a proximity of the robot to the spraying section, and a rate of chemical flow based on the type of agricultural treatment, the dosage, and the spraying section. The system may then control the robot to match the determined speed of the robot and the proximity of the robot. Finally, the system may dispense the chemical using a spraying equipment based on the rate of chemical flow.

Certain technical challenges exist in automation of agricultural treatments. One technical challenge faced while determining a spraying section for an agricultural treatment is that the spraying section may be different for different types of agricultural treatments depending on the purpose of the agricultural treatment. For example, the spraying section for a pesticide spraying agricultural treatment may be the bark of a tree because the bark may be prone to pest infestation. The solution presented in the embodiments disclosed herein to address the above challenge is using a machine learning algorithm along with a set of image sensors including cameras and LiDAR (Light Detection and Ranging). The machine learning algorithm may be trained to detect the spraying section in a set of images obtained from the image sensors for a plurality of types of agricultural treatments.

Another technical challenge faced may be that disproportionate spraying of chemicals may lead to a damaged yield of crops. For example, the robot may spray more quantity of chemicals in one area of the target location such that the remaining area of the target location is untreated. This may lead to destruction of crops in the area of the target location that got more quantity of chemicals than required and destruction of the crops in the untreated area of the target location due to lack of chemicals. Another possibility may be that the robot was closer to some trees and away from some trees while spraying the chemicals leading to disproportionate treatment of the trees. The solution presented in the embodiments disclosed herein to address the above problem is using a robot control model to determine an appropriate speed of the robot, an appropriate proximity of the robot to the spraying section, and an appropriate rate of flow of the chemicals depending on the type of agricultural treatment, the spraying section and area of the target location. The robot control model may determine the appropriate values necessary for the agricultural treatment to avoid disproportionate spraying of the chemicals. The appropriate proximity may help the robot maintain the required distance from the spraying section, the appropriate speed may help the robot cover an area of the target location while spraying such that the area does not get sprayed with extra quantities of chemicals, and the appropriate rate of flow may help the robot spray the chemicals on a spraying section accurately such that the chemical reaches the spraying section from the robot.

Referring now to FIG. 1, a network implementation 100 of a system 102 for automation of agricultural treatments is disclosed. Initially, the system 102 receives a set of instructions including a type of agricultural treatment and a target location from a user through a graphical user interface (GUI). In an example, the user may use an application installed on a user device 104-1 having the GUI to input the target location and the type of agricultural treatment. It may be noted that the one or more users may access the system 102 through one or more user devices 104-1, 104-2 . . . 104-N, collectively referred to as user devices 104, hereinafter, or applications residing on the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, or a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 10 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

The system 102 may receive data from a set of sensors 114. The set of sensors may include image sensors, inertial sensors, LIDAR, location sensors, and the like installed on the robot.

As there are various challenges observed in the existing art, the challenges necessitate the need to build the system 102 for automation of agricultural treatments. At first, a user may use the user device 104 to access the system 102 via the I/O interface 110. The user may register the user devices 104 using the I/O interface 110 in order to use the system 102. In one aspect, the user may access the U/O interface 110 of the system 102. The detail functioning of the system 102 is described below with the help of figures.

The system as described herein is configured to execute a set of instructions for automation of agricultural treatments. In an embodiment, the system may receive a set of instructions for an agricultural treatment to be performed. The set of instructions may include a type of agricultural treatment, a time to complete the agricultural treatment, and a target location. It may be noted that the time to complete the agricultural treatment may be determined by the system based on the type of the agricultural treatment when the set of instructions does not comprise the time to complete the agricultural treatment. The type of agricultural treatment may be at least fertilizer spraying, pesticide spraying, herbicide spraying, and insecticide spraying.

In an embodiment, the type of agricultural treatment may include a crop type for the agricultural treatment. For example, "fertilizer spraying for oil palm trees," "pesticide spraying in an oil palm orchard," and the like. The target location may be at least a part of an agricultural field, a plantation, and one or more trees in an orchard.

Further to receiving the set of instructions, the system may determine chemical parameters for the agricultural treatment. The chemical parameters may include a composition, a dosage, and a quantity of the chemical. The chemical parameters may be determined based on the set of instructions. The composition of the chemical corresponds to at least a formula, and a list of one or more chemical and a concentration of the one or more chemicals. The dosage of the chemical corresponds to a ratio between a volume of the chemical to be sprayed and area of the target location.

In an embodiment the system may use a database comprising a plurality of types of agricultural treatments, and corresponding composition and dosage of the chemical required. The system may calculate the quantity of chemical required as a product of the dosage and area of the target location. For example, let us assume that the dosage is 1 liter/yard$^2$ and that the area of the target location is 4 yards$^2$. The quantity of chemical required may be calculated as 4 liters.

In another embodiment, the system may use a machine learning algorithm to determine the chemical parameters. The machine learning algorithm may be trained using a training dataset comprising a plurality of sets of instructions, chemical parameters for the plurality of sets of instructions, and information from internet sources. The information from the internet sources may be updated at regular intervals of time. The information from the internet sources may comprise discoveries and research in the field of agriculture. The machine learning algorithm may be trained to produce chemical parameters as an output for an input of a set of instructions. Consider an example, the training dataset may comprise chemical parameters for a particular set of instructions.

Let us assume the set of instructions are:
Type of agricultural treatment—"Fertilizer spraying for Oil Palm trees"
Target Location—"Latitude—37.43, Longitude—44.689; Latitude—27.63. Longitude—84.685; Latitude—38.43, Longitude—74.639; Latitude—45.43, Longitude—54.239"

Let us assume that the target location is an area enclosed within the coordinates. In another example, the target location may be one or more trees located at the coordinates.

Let us assume that the chemical parameters in the training dataset are:
Composition—"Potassium—20%; Nitrogen—60%; Phosphorous—20%."
Dosage—3 Liters/yard$^2$. In another example, the dosage may be 2 Liters/tree.

Let us assume that the information from the internet sources comprises a discovery stating that better results of yield were observed with the following composition of fertilizers for Oil Palm Trees—"Potassium—40%; Nitrogen—40%; Phosphorous—20%." The machine learning algorithm may produce the following chemical parameters as output:
Composition—"Potassium—40%; Nitrogen—40%; Phosphorous—20%."
Dosage—3 Liters/yard$^2$.

In an embodiment, the robot may have storage bins or containers to store the one or mom chemicals. The storage bins may have a set of sensors to determine amount of chemical in the storage bins. Further, the sensors may communicate the amount of chemical in the storage bins to the system. Subsequently, the system may compare the amount of chemical in the storage bins and the quantity of chemical required for the agricultural treatment. Further, the system may instruct the robot to automatically return to a base station for automatically refilling of chemicals in case the amount of chemical in the storage bins is less than the determined quantity of chemicals required for the agricultural treatment.

Further to determining the chemical parameters, the system may navigate the robot to the target location. The system may use at least one of autonomous navigation techniques, assisted navigation techniques, and manual navigation techniques to navigate the robot to the target location. The autonomous navigation techniques may include using navigation algorithms employing GPS (Global Positioning System), GNSS (Global Navigation Satellite System), LiDAR, one or more inertial sensors installed on the robot including an accelerometer, and a gyro-meter, one or more vision cameras, and one or more depth cameras.

In an embodiment, the navigation algorithm may include at least one of an obstacle detection algorithm, a terrain identification algorithm, and a kinodynamic motion planning model. The navigation algorithms may be trained to produce a route for the robot as an output by processing a set of images obtained using the one or more vision cameras and depth cameras. The route may be determined based on a coefficient of traversal. The coefficient of traversal may be determined using the kinodynamic motion planning model that may be trained to determine motility of the robot in a type of terrain (e.g., snowy, muddy, etc.) based on the type of terrain identified by the terrain identification model, and inertial parameters like angular velocity, momentum of the robot obtained from the inertial sensors. The coefficient of traversal may be a value between 0 and 1. The route may be least traversable by the robot when the coefficient of traversal is 0 and most traversable by the robot when the coefficient of traversal is 1. The navigation algorithms may determine the route for the robot such that the route may have the coefficient of traversal greater than a pre-defined threshold.

The assisted navigation techniques may include using a navigation software such as Google Maps®, and a display to provide directions to a user. The user may exert physical force on the robot to propel the robot in the direction displayed. Further, manual navigation techniques may include a user exerting physical force on the robot to propel the robot towards the target location based on the user's memory and experience.

Upon the robot reaching the target location, the system may detect a spraying section based on the type of agricultural treatment. The system may use at least a set of cameras, and a plurality of sensors installed on the robot to detect the spraying section. The spraying section may be a part of the target location depending on the type of agricultural treatment. The spraying section may be at least one of a specific area of soil, part of the tree. As an example, and not by way of any limitation, the spraying section may be soil around the tree for fertilizer spraying in a cotton farm, soil covered in grass for fertilizer spraying in Oil Palm orchards, and the like. As an example, and not by way of any limitation, the spraying section may be at least one of soil not covered in grass, fronds laid on the soil, bark of the tree, branches of the tree, leaves and the like. The system may obtain a set of images using the set of cameras installed on the robot. Further, the set of images may be analyzed using a machine learning algorithm. The machine learning algorithm (image processing model) may be trained using a training dataset comprising a plurality of types of agricultural treatments, a plurality of sets of images, a plurality of spraying sections annotated on the plurality of sets of images corresponding to the plurality of types of agricultural treatments. The machine learning algorithm may be trained to produce an output comprising a set of images with annotated spraying sections for an input of a type of agricultural treatment and the set of images without annotations.

Consider an example, the type of agricultural treatment is "pesticide spraying for palm oil orchards." The system may begin obtaining images of the robot's surroundings once the system determines that the robot has reached the target location. The system may then analyze the images to detect the spraying section in the images. Let us assume that the spraying section for pesticide spraying in palm oil orchards is "bark of trees; branches of trees" based on the annotations in the training dataset. The system detects the spraying section as the part of the target location, from the images, that may be similar to the annotated parts in the set of images, from the training dataset, using the image processing model.

Further to detecting the spraying section, the system may determine a speed of the robot, a proximity of the robot to the spraying section, and a rate of chemical flow based on the type of agricultural treatment, the dosage, and the spraying section using a robot control model. The robot control model may be trained using a training dataset comprising a plurality of types of agricultural treatments, a plurality of dosages, a plurality of spraying sections, and corresponding plurality of values of the speed of the robot, the proximity of the robot to the spraying section, and the rate of chemical flow. The robot control model may be trained to produce an output comprising a speed of the robot, a proximity of the robot to a spraying section and a rate of chemical flow for an input comprising a type of agricultural treatment, a dosage, and a spraying section.

In an embodiment, the system may determine a total area of the spraying section based on the detected spraying section from the set of images using image processing and geometric algorithms. Further, the system may determine the quantity of chemical required as a product of the dosage and the total area of the spraying section. The proximity of the robot to the spraying section may be determined based on the type of agricultural treatment. The robot control model may be trained using a training dataset of plurality of agricultural treatments and corresponding values of proximity of the robot to the spraying section. For example, the proximity of the robot to the spraying section for fertilizer spraying may be 1 yard.

Further to determining the proximity, the robot control model may be used to determine the speed of the robot and the rate of chemical flow based on the total area of the spraying section, the dosage, and the proximity of the robot to the spraying section. The robot control model may be trained using supervised learning techniques, and recursive learning techniques.

The robot control model may be trained to determine a time to complete the agricultural treatment based on the type of agricultural treatment using a training database comprising a plurality of types of agricultural treatments and corresponding values of the time to complete the agricultural treatment. Further, the robot control model may be trained to determine the speed of the robot and the rate of chemical flow based on the total area of the spraying section, the time to complete the agricultural treatment, the proximity of the robot to the spraying section, and the dosage.

In an example, if the type of agricultural treatment is fertilizer spraying, the dosage is 2 litres/yard$^2$, and the total area of the detected spraying section is 10 yard$^2$. The robot control model determines the proximity of the robot to the spraying section to be equal to 1 yard. Further, the robot control model is trained to determine the speed of the robot, and the rate of chemical flow such that the robot sprays 2 litres of chemical while it covers 1 yard$^2$. Let us assume that the robot uses a spraying equipment that may be adjusted to have a spraying radius of 1 yard and a spraying distance of 1 yard. The spraying radius may correspond to a patch or a part of a field that receives chemicals. The spraying distance may correspond to a distance between the robot and the spraying radius. For the example, the robot control model may determine the speed of the robot equal to 1 yard/sec, and the rate of flow chemical flow equal to 2 litres/sec.

Further, the system may be configured to control the robot to match the determined speed of the robot and the proximity of the robot. The system may control the robot using navigation algorithms. The system may continuously measure the speed of the robot and the proximity of the robot to the spraying section using one or more inertial sensors and imaging sensors including cameras and LIDAR installed on the robot. The navigation algorithms may be trained to command the system to increase or decrease the speed of the robot to match the determined speed of the robot. Further, the navigation algorithms may be trained to command the system to steer the robot towards the spraying section or away from the spraying section to match the determined proximity of the robot. The navigation algorithms may be trained using a training dataset comprising a plurality of values of determined speed of the robot and determined proximity of the robot, a plurality of values of measured speed of the robot and measured proximity of the robot, a plurality of commands corresponding to the plurality of values of determined speed of the robot and measured speed of the robot, and a plurality of commands corresponding to the plurality of values of determined proximity of the robot and measured proximity of the robot. The navigation algorithms may be trained to produce an output comprising a command for the speed of the robot, and a command for the proximity of the robot to the spraying section for an input of a determined speed of the robot, a determined proximity of the robot to spraying section, a measured speed of the robot, and a measured proximity of the robot to the spraying section.

Consider an example, let us assume that the determined speed of the robot is 2 yards/sec, the determined proximity of the robot to the spraying section is 1 yard, the measured speed of the robot is 3 yards/sec and the measured proximity of the robot to the spraying section is 2 yards. The navigation algorithms may command the system to decrease the speed of the robot until the measured speed of the robot is equal to 2 yards/sec. Further, the navigation algorithms may command the system to steer the robot towards the spraying section until the measured proximity of the robot to the spraying section is equal to 1 yard.

Finally, the system is configured to dispense the chemical using a spraying equipment when the robot reaches the determined speed of the robot and the determined proximity of the robot to the spraying section. The spraying equipment may be mounted on a mechanical arm connected to the robot. In an embodiment, the system may be configured control the mechanical arm to move the spraying equipment based on the measured proximity of the robot to the spraying section and the determined proximity of the robot to the spraying section. The system may control the mechanical arm to move the spraying equipment towards or away from the spraying section without moving the robot. In another embodiment, the system may be configured to control the spraying equipment based on the rate of flow of chemical, the proximity of the robot to the spraying section, the spraying distance of the spraying equipment, and the spraying radius of the spraying equipment using a closed loop flow control mechanism. The closed loop flow control mechanism may include basic control elements, such as, one or more sensors, one or more transmitters, a controller and a regulator. The one or more sensors may be used to measure pressure of the chemical being dispensed. The one or more transmitters may be used to transmit data received from the one or more sensors to the controller. The controller may be configured to adjust the pressure of the chemical being dispensed by controlling the regulator based on the data received from the one or more sensors. The regulator may be used to increase or decrease the pressure of the chemical being dispensed by a type of mechanical motion of the regulator such as turning, screwing, and the like. In another embodiment, the system may be configured to control the spraying distance and the spraying radius of the spraying equipment.

In an embodiment, the system may be configured to halt dispensing the chemical when the measured proximity of the robot to the spraying section and the measured speed of the robot do not match the determined proximity of the robot to the spraying section and the determined speed of the robot respectively.

In an embodiment, the system may be configured to control one or more robots to perform the agricultural treatment. The system may be configured to communicate between the one or more robots. Consider an example, let us assume that the target location is an area of 300 yards$^2$ within a set of coordinates received from the user. Let us assume that the spraying section is distributed throughout the target location in 5 patches of 10 yards$^2$. The system may control one or more robots (5 robots) to perform the agricultural treatment. The system may navigate each of the 5 robots to a different patch of the 5 patches. Further, the system may control each of the 5 robots to perform the agricultural treatment simultaneously at the 5 patches.

In an embodiment, the system may determine the status of the agricultural treatment. The status may be determined after a predefined interval of time. The status may be either complete or incomplete. The system may be configured to measure an amount of chemical left in the storage bins using weight sensors installed in the storage bins. The system may compare the determined quantity of chemical required for the agricultural treatment and the difference between the amount of chemical in the storage bins before starting the agricultural treatment and at the time of determining the status. The status may be incomplete when the difference between the amount of chemical in the storage bins before starting the agricultural treatment and at the time of determining the status is not equal to the determined quantity of chemical required for the agricultural treatment. The status may be complete otherwise. In an embodiment, the system may be configured to navigate the robot to a base station when the status is complete. The base station may be a predefined location received from a user.

In an embodiment, the system may report the status to at least a user, and a monitoring system. The monitoring system may be used by the user to track and schedule one or more agricultural treatments.

Figure 2:
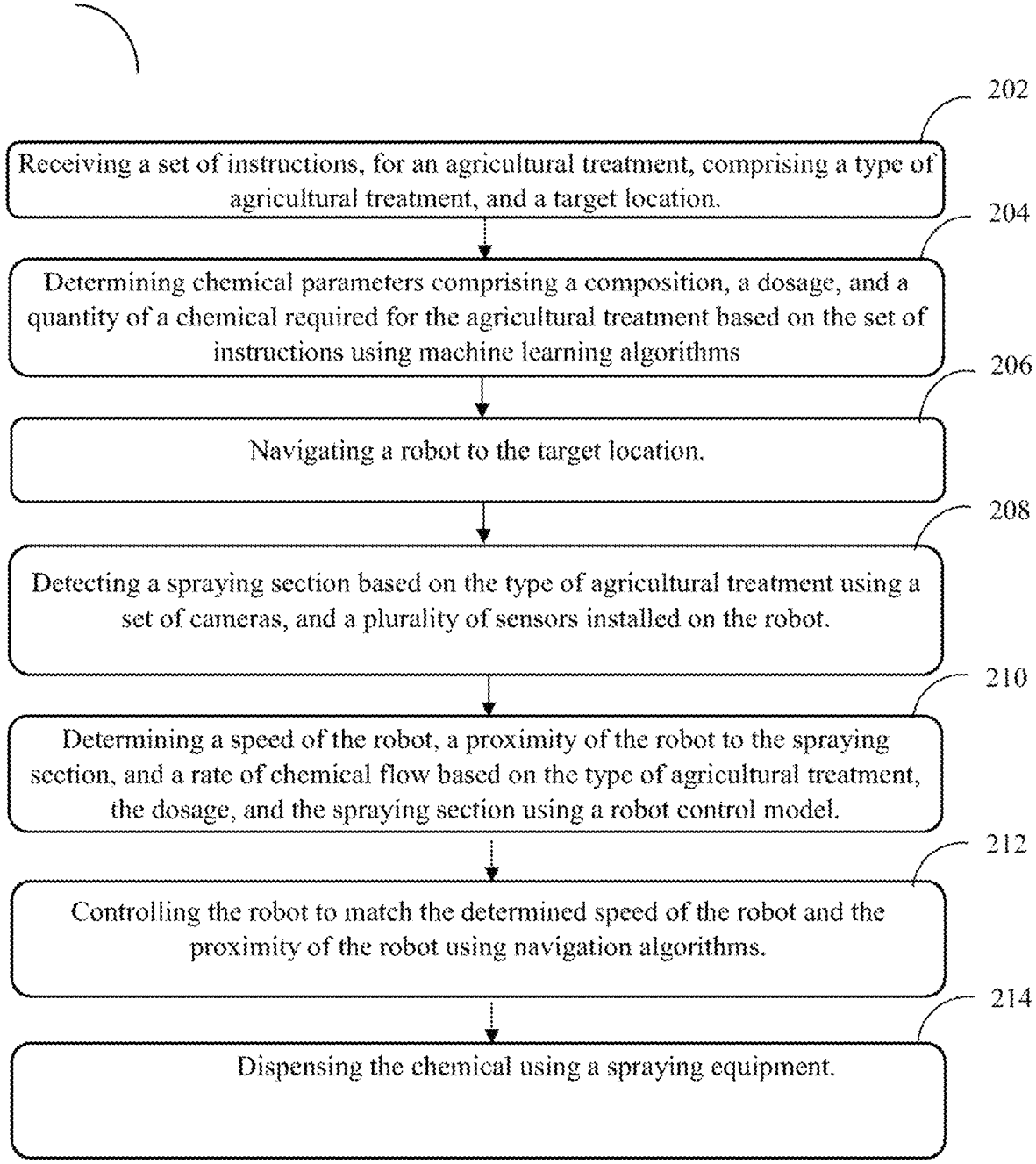
FIG. 2 illustrates a method for automation of agricultural treatments, in accordance with an embodiment of the present subject matter.

Referring now to FIG. 2, a method 200 for automation of agricultural treatments is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for automation of agricultural treatments. Furthermore, the method 200 for automation of agricultural treatments can be implemented in any suitable hardware, software, firmware, or combination thereof. However, for ease of explanation, in the embodiments described below, the method 200 may be considered to be implemented in the above-described system 102.

At block 202, a set of instructions for an agricultural treatment may be received. The set of instructions may include a type of agricultural treatment, and a target location. The type of agricultural treatment may be at least one of fertilizer spraying, pesticide spraying, herbicide spraying, and insecticide spraying.

At block 204, chemical parameters including a composition, a dosage, and a quantity of a chemical required for the agricultural treatment may be determined. The chemical parameters may be determined based on the set of instructions using machine learning algorithms.

At block 206, the robot may be navigated to the target location.

At block 208, a spraying section may be detected based on the type of agricultural treatment. The spraying section may be detected in a set of images obtained using a set of cameras and a plurality of sensors installed on the robot.

At block 210, a speed of the robot, a proximity of the robot to the spraying section, a rate of chemical flow may be determined using a robot control model.

At block 212, the robot may be controlled to match the determined speed of the robot, and the proximity of the robot to the spraying section At block 214, the chemical may be dispensed using a spraying equipment. The chemical is dispensed when the robot reaches the determined speed of the robot and the determined proximity of the robot to the spraying section.

Figure 3:
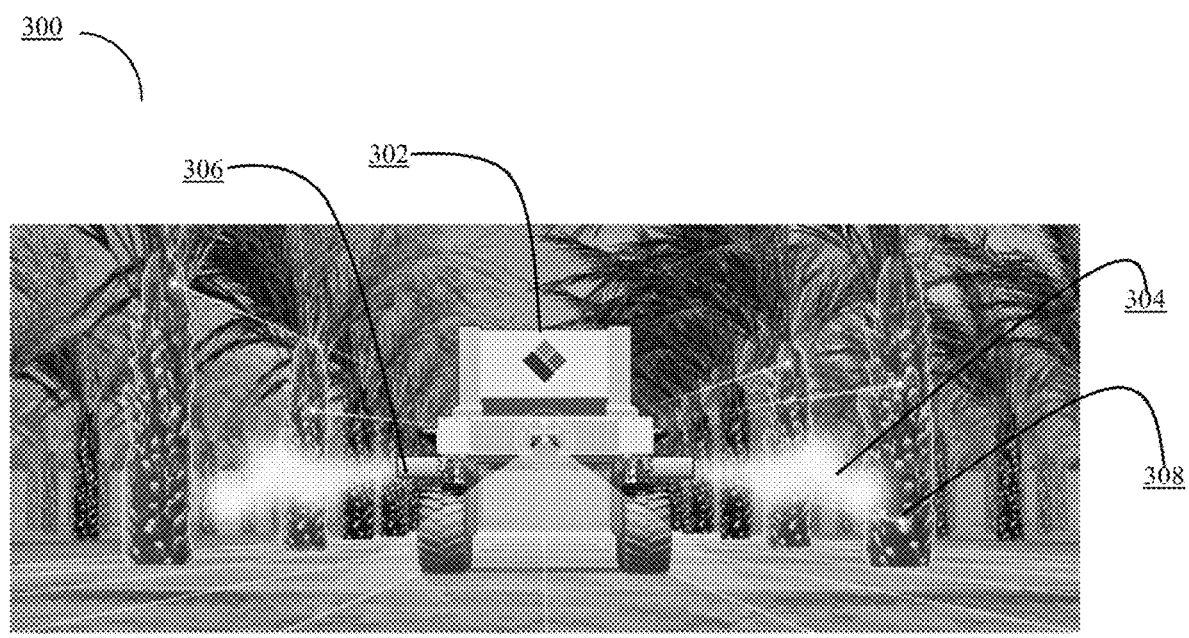
FIG. 3 illustrates a robot spraying a chemical on a spraying section, in accordance with an embodiment of the present subject matter.

Referring to FIG. 3, an example (300) of a robot (302) spraying a chemical (304) on a spraying section (308) for an agricultural treatment is illustrated. The chemical may be sprayed using a spraying equipment (306) mounted on the robot. In FIG. 3, the robot is being navigated through the middle of parallel rows of trees using the system (102). Further, the robot is spraying the chemical on the spraying section detected by the system (102).

Figure 4:
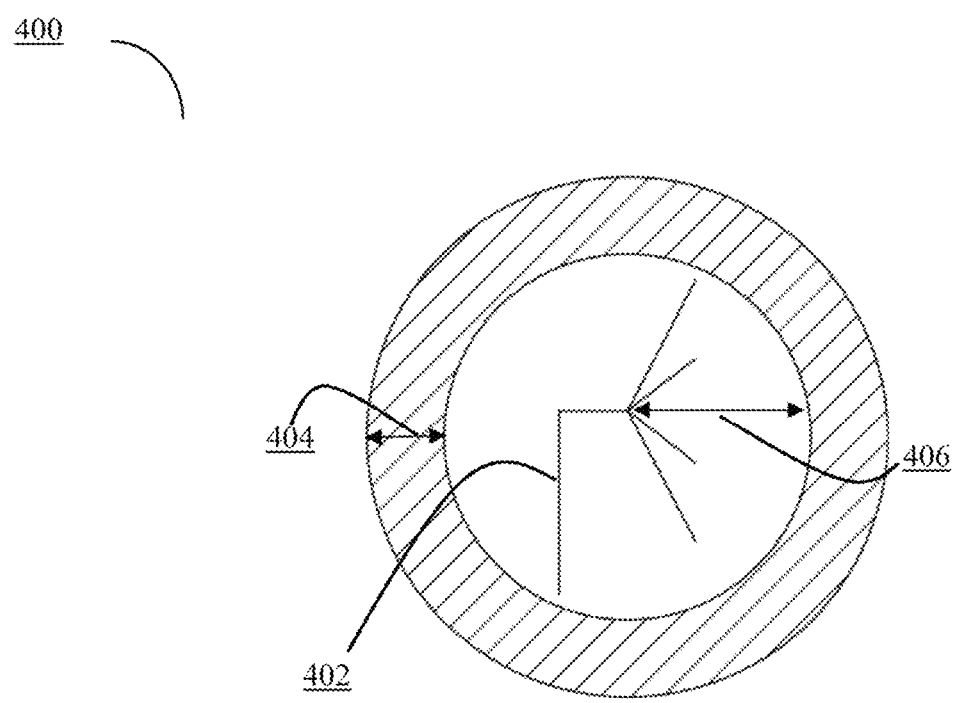
FIG. 4 illustrates an example of a spraying equipment with an adjusted spraying radius and spraying distance, in accordance with an embodiment of the subject matter.

Referring to FIG. 4, an example (400) of a spraying equipment (402) with an adjusted spraying radius (404) and spraying distance (406), in accordance with an embodiment of the subject matter is shown. It may be noted that the spraying equipment may be able to spray with a uniform spraying distance and spraying radius in 360°.

Figure 5:
FIG. 5 illustrates an example of a spraying section, in accordance with an embodiment of the subject matter.

Referring now to FIG. 5, an example (500) of a spraying section (504), in accordance with an embodiment of the subject matter. In FIG. 5, the spraying section (504) is lower area of a bark of trees (502-a, 502-b).

Figure 6:
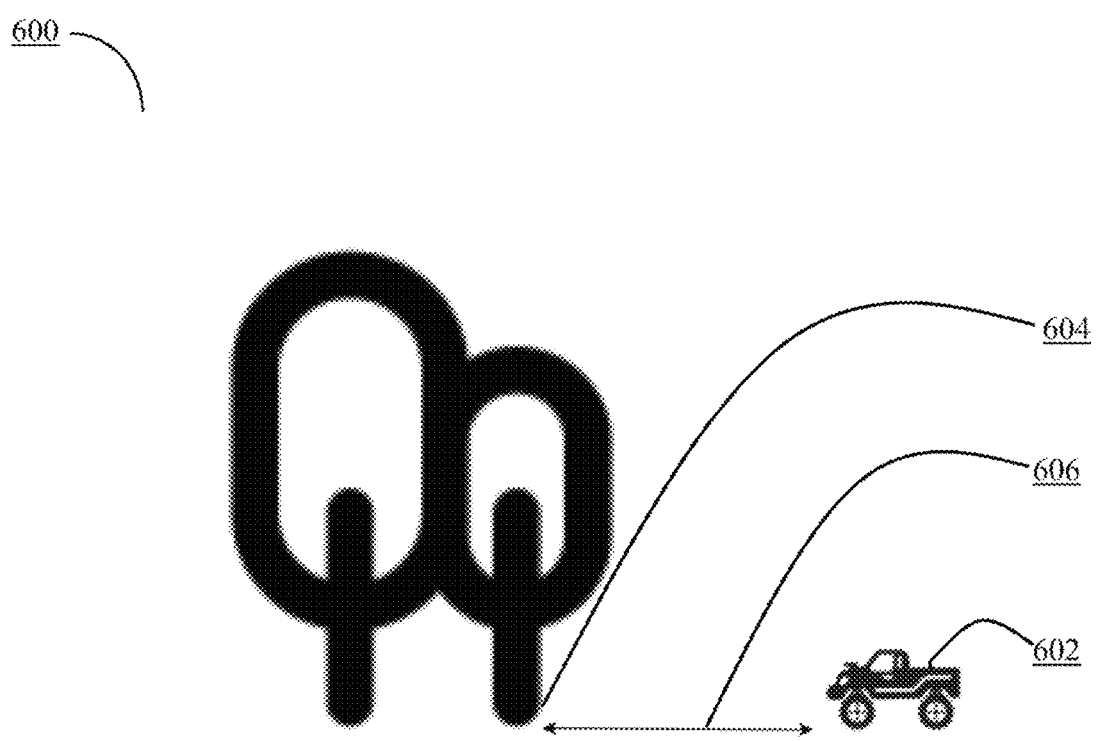
FIG. 6 illustrates an example of proximity of a robot to a spraying section, in accordance with an embodiment of the subject matter.

Referring now to FIG. 6, an example (600) of proximity (604) of a robot (602) to a spraying section (606), in accordance with an embodiment of the subject matter. The proximity of the robot to the spraying section corresponds to the distance between the robot and the spraying section. The proximity of the robot to the spraying section may change based on a type of agricultural treatment, and a spraying equipment depending on a pressure of chemical being dispensed supported by the spraying equipment.

Figure 7:
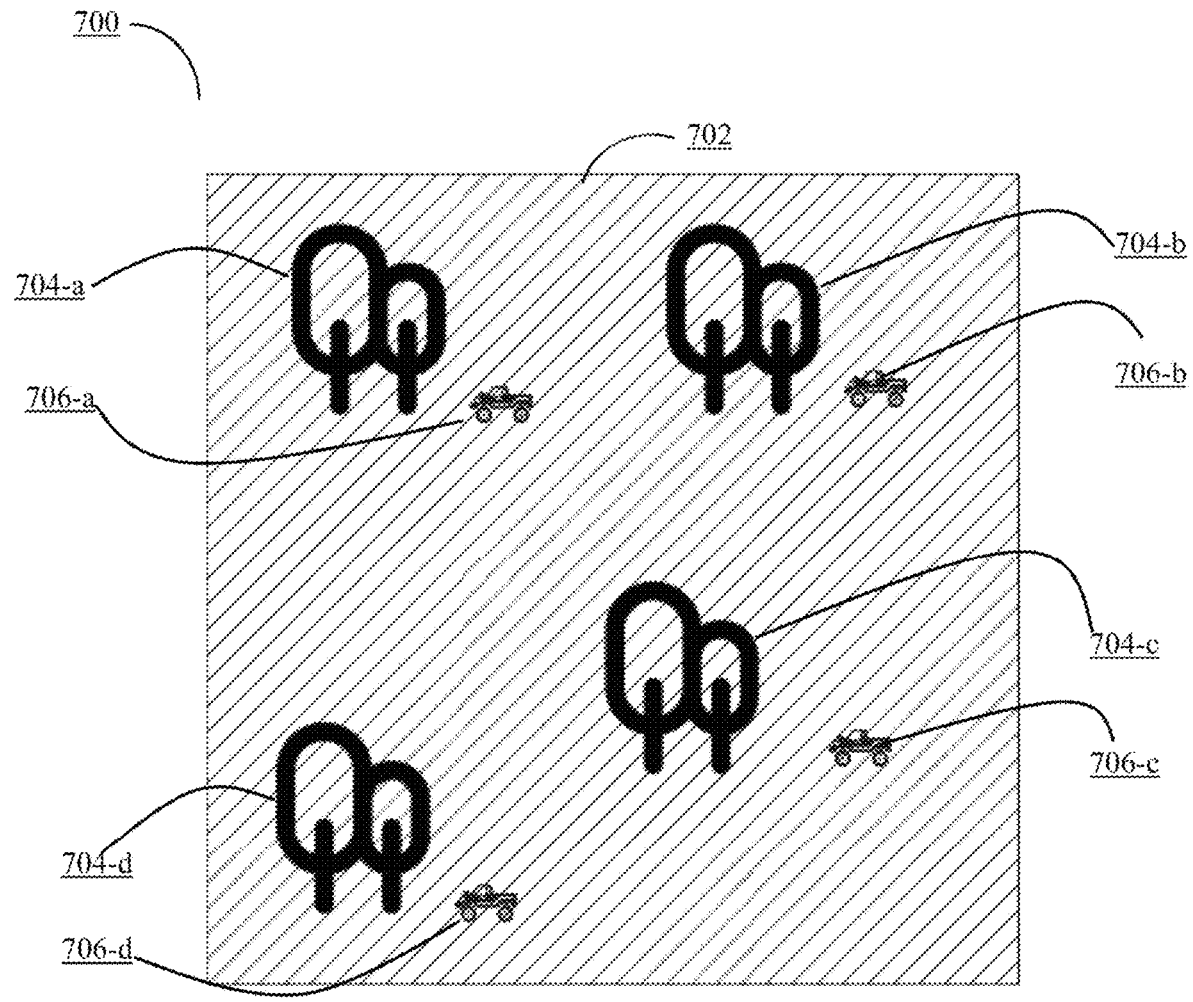
FIG. 7 illustrates an example of an agricultural field having a plurality of spraying sections and a plurality of robots working simultaneously to perform an agricultural treatment.

Referring now to FIG. 7, an example (700) of an agricultural field (702) having a plurality of spraying sections (704-a, 704-b, 704-c, 704-d) and a plurality of robots (706-a, 706-b, 706-c, 706-d) working simultaneously to perform an agricultural treatment. The plurality of robots may communicate with each other using wireless technologies including Wi-Fi (Wireless Fidelity), Bluetooth, and the like. The plurality of robots may be controlled using a fleet control model. The fleet control model may be trained using supervised learning techniques and recursive learning techniques. The fleet control model may be trained using a training dataset of a set of robot specifications, a set of target locations, a set of types of agricultural treatments, a set of number of robots available, and a number of robots appointed, and robot specifications of the robots appointed for each set of target locations, robot specifications, types of agricultural treatments, number of robots available. The fleet control model may be configured to determine a number of robots needed, specifications of the robots needed, and target locations for each robot for an input of a type of agricultural treatment, target locations, number of robots available, and specifications of the robots available. In an embodiment, the fleet control model may also command the plurality of robots to perform an agricultural treatment simultaneously using the system 102.

Figure 8:
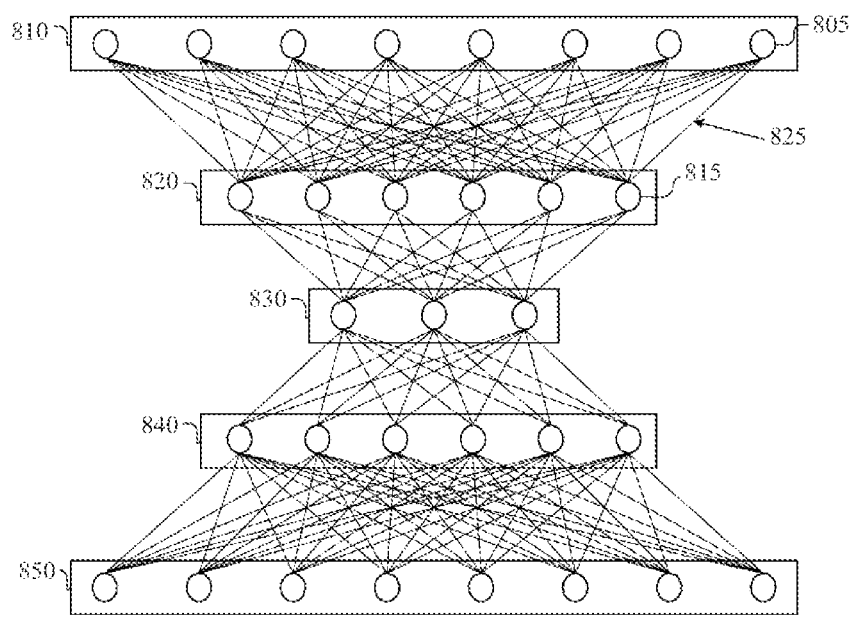
FIG. 8 illustrates an example artificial neural network, in accordance with an embodiment of the present subject matter.

Referring now to FIG. 8 that illustrates an example artificial neural network ("ANN") 800 of the machine learning algorithms. Machine learning algorithms use ANN to train for producing outputs for a set of inputs. In an exemplary embodiment, an ANN may refer to a computational model comprising one or more nodes. Example ANN (800) may comprise an input layer (810), hidden layers (820, 830, 860,) and an output layer (850). Each layer of the ANN (800) may comprise one or more nodes, such as a node (805) or a node (815). In particular embodiments, each node of an ANN may be connected to another node of the ANN. As an example, and not by way of limitation, each node of the input layer (810) may be connected to one of more nodes of the hidden layer (820). In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example, and not by way of limitation, although FIG. 8 depicts a connection between each node of the input layer (810) and each node of the hidden layer (820), one or more nodes of the input layer (810) may not be connected to one or more nodes of the hidden layer (820).

In particular embodiments, an ANN may be a feedforward ANN (e.g., an ANN with no cycles or loops where communication between nodes flows in one direction beginning with the input layer and proceeding to successive layers). As an example, and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 860. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example, and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example, and not by way of limitation, a connection (825) between the node (805) and the node (815) may have a weighting coefficient of 0.4, which may indicate that 0.4 multiplied by the output of the node (805) is used as an input to the node (815). In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example, and not by way of limitation, training data may comprise inputs to the ANN 800 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example, and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, the ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method may help in may prevent damage to crops due to over exposure to chemicals.

Some embodiments of the system and the method may reduce amount of chemicals required for an agricultural treatment by only spraying at the spraying sections in the target location.

Some embodiments of the system and the method may reduce time of recovering a robot from the agricultural field when the agricultural treatment is completed.

Some embodiments of the system and the method enable performing an agricultural treatment faster by using multiple robots simultaneously.

Some embodiments of the system and the method may help in reducing human participation in agricultural treatments.

Although implementations for methods and system for automation of agricultural treatments have been described in language specific to structural features and/or methods, it is to be understood that the appended claims are not necessarily limited to the specific features or methods described. Rather, the specific features and methods are disclosed as examples of implementations for automation of agricultural treatments.

The invention claimed is:

1. A method for automation of an agricultural treatment, the method comprising:
    receiving, by a processor, a set of instructions for the agricultural treatment, wherein the set of instructions comprises a type of agricultural treatment and a target location, and wherein the target location is at least one of a part of an agricultural field and one or more trees in the agricultural field;
    determining, by the processor, chemical parameters comprising a composition, a dosage, and a quantity of a chemical required for the agricultural treatment based on the set of instructions using a machine learning algorithm;
    navigating, by the processor, a robot through a route to the target location by processing a set of images obtained using at least one of a vision camera and a depth camera, wherein the route is determined based on a coefficient of traversal which is greater than a predefined threshold and at least one navigation algorithm, and wherein the coefficient of traversal indicates traversable terrain for the robot;
    detecting, by the processor, a spraying section from the target location based on the type of agricultural treatment using a set of sensors installed on the robot, wherein the spraying section is detected using an image processing model, wherein the image processing model is trained using a training dataset comprising different types of agricultural treatment, a plurality of images of the agricultural field, and a plurality of spraying sections corresponding to the different types of agricultural treatments annotated on the plurality of images, and wherein the spraying section is a part of the target location;
    determining, by the processor,
        a speed of the robot, a proximity of the robot to the spraying section, and a rate of chemical flow based on the type of agricultural treatment, the dosage, and the spraying section using a robot control model,
        an area of the detected spraying section from the set of images by using an image processing algorithm and a geometric algorithm, and
        a quantity of chemical required to be sprayed on the area based on a product of the dosage and the area of the spraying section;
    controlling, by the processor, the robot to match the determined speed of the robot and the determined proximity of the robot using a navigation algorithm; and
    dispensing, by the processor, the chemical using a spraying equipment.

2. The method in claim 1, wherein the type of agricultural treatment is at least one of fertilizer spraying, pesticide spraying, herbicide spraying, and insecticide spraying.

3. The method in claim 1, wherein the composition of the chemical comprises one or more chemicals, and a concentration of the one or more chemicals.

4. The method in claim 1, wherein the dosage corresponds to a ratio between a volume of the chemical to be sprayed and an area of the target location.

5. The method in claim 1, wherein the rate of chemical flow is a ratio between a volume of the chemical dispensed and time.

6. The method in claim 1, wherein navigating the robot to the target location involves at least one of using navigation algorithms, GPS (Global Positioning System), GNSS (Global Navigation Satellite System), LIDAR, one or more inertial sensors including an accelerometer, and a gyroscope, one or more vision cameras, and one or more depth cameras, or human participation.

7. The method in claim 1, wherein the spraying section is detected by analysing a set of images obtained from the set of sensors using an image processing model, and wherein the spraying section includes at least one of an organ of the one or more trees, an area of soil without grass around the one or more trees, an area of soil with grass around the one or more trees, and fronds laid on the soil beside the one or more trees.

8. The method in claim 1, further comprises determining a status of the agricultural treatment based on a remaining amount of the chemical, and the quantity of chemical required for the agricultural treatment, wherein the status of the agricultural treatment is either complete or incomplete, and wherein the remaining amount of the chemical is measured using a weight sensor.

9. The method in claim 8, wherein the status of the agricultural treatment is reported to at least a user, and a monitoring system, and wherein the robot is instructed to return to a base station when the status of the agricultural treatment is complete.

10. The method in claim 9, wherein the monitoring system is used to at least track and schedule one or more agricultural treatments performed by the robot.

11. The method in claim 1, wherein controlling the robot further comprises measuring the speed of the robot and the proximity of the robot to the spraying section using at least one of one or more inertial sensors, the set of sensors, and a proximity sensor.

12. The method in claim 1, wherein the chemical is dispensed based on the determined rate of chemical flow, and the dosage using a closed loop flow control mechanism and a spraying equipment handling model, and wherein the chemical is dispensed when the robot reaches the determined speed and proximity.

13. The method in claim 1, wherein the robot is at least a machine, an unmanned aerial vehicle, and a field robot having one or more mechanical equipment and the set of sensors, wherein one or more robots are used simultaneously, and wherein the one or more robots communicate with each other.

14. A system for automation of an agricultural treatment, the system comprising:
   a memory; and
   a processor coupled to the memory, wherein the processor is configured to execute program instructions stored in the memory for:
      receiving a set of instructions for the agricultural treatment, wherein the set of instructions comprises a type of agricultural treatment and a target location, and wherein the target location is at least one of a part of an agricultural field and one or more trees in the agricultural field;
      determining chemical parameters comprising a composition, a dosage, and a quantity of a chemical required for the agricultural treatment based on the set of instructions using a machine learning algorithm;
      navigating a robot through a route to the target location by processing a set of images obtained using at least one of a vision camera and a depth camera, wherein the route is determined based on a coefficient of traversal which is greater than a pre-defined threshold and at least one navigation algorithm, and wherein the coefficient of traversal indicates traversable terrain for the robot;
      detecting a spraying section from the target location based on the type of agricultural treatment using a set of sensors installed on the robot, wherein the spraying section is detected using an image processing model, wherein the image processing model is trained using a training dataset comprising different types of agricultural treatment, a plurality of images of the agricultural field, and a plurality of spraying sections corresponding to the different types of agricultural treatments annotated on the plurality of images, and wherein the spraying section is a part of the target location;
      determining
         a speed of the robot, a proximity of the robot to the spraying section, and a rate of chemical flow based on the type of agricultural treatment, the dosage, and the spraying section using a robot control model,
         an area of the detected spraying section from the set of images by using an image processing algorithm and a geometric algorithm, and
         a quantity of chemical required to be sprayed on the area based on a product of the dosage and the area of the spraying section;
      controlling the robot to match the determined speed of the robot and the determined proximity of the robot using a navigation algorithm; and
      dispensing the chemical using a spraying equipment.

15. A non-transitory computer program product having embodied thereon a computer program for automation of an agricultural treatment, the computer program product storing instructions for:
   receiving a set of instructions for the agricultural treatment, wherein the set of instructions comprises a type of agricultural treatment and a target location, wherein the target location is at least one of a part of an agricultural field and one or more trees in the agricultural field;
   determining chemical parameters comprising a composition, a dosage, and a quantity of a chemical required for the agricultural treatment based on the set of instructions using a machine learning algorithm,
   navigating a robot through a route to the target location by processing a set of images obtained using at least one of a vision camera and a depth camera, wherein the route is determined based on a coefficient of traversal which is greater than a pre-defined threshold and at least one navigation algorithm, and wherein the coefficient of traversal indicates traversable terrain for the robot;
   detecting a spraying section from the target location based on the type of agricultural treatment using a set of sensors installed on the robot, wherein the spraying section is detected using an image processing model, wherein the image processing model is trained using a training dataset comprising different types of agricultural treatment, a plurality of images of the agricultural field, and a plurality of spraying sections corresponding to the different types of agricultural treatments annotated on the plurality of images, and wherein the spraying section is a part of the target location;
   determining
      a speed of the robot, a proximity of the robot to the spraying section, and a rate of chemical flow based on the type of agricultural treatment, the dosage, and the spraying section using a robot control model,
      an area of the detected spraying section from the set of images by using an image processing algorithm and a geometric algorithm, and
      a quantity of chemical required to be sprayed on the area based on a product of the dosage and the area of the spraying section;
   controlling the robot to match the determined speed of the robot and the determined proximity of the robot using a navigation algorithm; and
   dispensing the chemical using a spraying equipment.

16. The method in claim 1, wherein the navigation algorithm is trained to at least one of steer the robot towards the spraying section and steer the robot away from the spraying section to match the determined proximity of the robot.

17. The method in claim 11, wherein the controlling the robot further comprises:
   navigating the robot to a base for filling the chemical based on the quantity of chemical required to be sprayed on the area,
   moving the spraying equipment based on measured proximity of the robot to the spraying section and the determined proximity of the robot to the spraying section,
   controlling a mechanical arm of the robot to move the spraying equipment towards or away from the spraying section without moving the robot, and
   controlling the spraying equipment based on the rate of chemical flow, the proximity of the robot to the spraying section, spraying distance of the spraying equipment from the target location, and spraying radius of the spraying equipment using a closed loop flow control mechanism.

18. The method in claim 17, further comprises halting dispensing the chemical when the measured proximity of the robot to the spraying section and the measured speed of the robot are not equivalent to the determined proximity of the robot to the spraying section and the determined speed of the robot respectively.

* * * * *